United States Patent
Kocol et al.

(10) Patent No.: US 6,859,904 B2
(45) Date of Patent: Feb. 22, 2005

(54) APPARATUS AND METHOD TO FACILITATE SELF-CORRECTING MEMORY

(75) Inventors: James E. Kocol, San Diego, CA (US); Ashley N. Saulsbury, Los Gatos, CA (US); Sandra C. Lee, Carlsbad, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 594 days.

(21) Appl. No.: 09/854,095

(22) Filed: May 11, 2001

(65) Prior Publication Data

US 2002/0170014 A1 Nov. 14, 2002

(51) Int. Cl.$^7$ .............. G11C 29/00; G11C 7/00; G06F 12/00
(52) U.S. Cl. .............. 714/764; 714/718; 365/201; 711/118
(58) Field of Search ............... 714/718, 719, 714/42, 763, 764; 365/201; 711/118, 119

(56) References Cited

U.S. PATENT DOCUMENTS

| | | | |
|---|---|---|---|
| 4,319,356 A | | 3/1982 | Kocol et al. ......... 371/38 |
| 5,604,753 A | * | 2/1997 | Bauer et al. ......... 714/763 |
| 6,076,183 A | * | 6/2000 | Espie et al. ......... 714/764 |
| 6,101,614 A | * | 8/2000 | Gonzales et al. ......... 714/6 |
| 6,212,631 B1 | * | 4/2001 | Springer et al. ......... 713/1 |
| 6,304,992 B1 | * | 10/2001 | Cypher ......... 714/757 |
| 6,480,975 B1 | * | 11/2002 | Arimilli et al. ......... 714/52 |
| 2002/0157056 A1 | * | 10/2002 | Chaudhry et al. ......... 714/763 |

* cited by examiner

Primary Examiner—Albert Decady
Assistant Examiner—Cynthia Britt
(74) Attorney, Agent, or Firm—Park, Vaughan & Fleming LLP

(57) ABSTRACT

One embodiment of the present invention provides a system that facilitates self-correcting memory in a shared-memory system. The system includes a main memory coupled to a memory controller for reading and writing memory locations and for marking memory locations that have been checked out to a cache. The system also includes a processor cache for storing data currently in use by a central processing unit. A communication channel is coupled between the processor cache and the memory controller to facilitate communication. The memory controller includes an error detection and correction mechanism and also includes a mechanism for reading data from the processor cache when a currently valid copy of the data is checked out to the processor cache. When the data is returned to the memory subsystem from the cache, the error detection and correction mechanism corrects errors and stores a corrected copy of the data in the main memory.

20 Claims, 3 Drawing Sheets

APPARATUS AND METHOD TO FACILITATE SELF-CORRECTING MEMORY

BACKGROUND

1. Field of the Invention

The present invention relates to computer memory. More specifically, the present invention relates to self-correcting memory in a shared memory multiprocessor system.

2. Related Art

Modern computing systems designers are under constant pressure to increase the speed and density of the integrated circuit devices, including the memory devices, within these systems.

Increasing the density of memory devices, however, can cause the occurrence of "soft errors" to increase, which can lead to erroneous computational results. These soft errors occur at random and are attributable to uncontrollable causes, such as alpha particle radiation. Increased density leads to smaller memory cells within the memory devices and, in turn, smaller charge levels within the cell to indicate the logic state of the cell. The smaller charge levels make a cell more susceptible to soft errors.

In an attempt to reduce the impact of soft errors within a memory system, designers have routinely used self-correcting memory systems as described in U.S. Pat. No. 4,319,356 issued to James E. Kocol and David B. Schuck. These self-correcting memory systems use additional bits within the device for storing an error correcting code, and use error correcting circuitry to correct any cells that have a soft error. In operation, the memory system periodically visits each cell within the memory system and corrects any errors detected in the cell's data. This process is termed "scrubbing the memory."

There are several methods that can be used to form the error correcting code, and to correct soft errors. In general, the number of bits assigned to the error correcting code determines how many errors the error correcting systems can correct. Commonly available systems include single bit error correction/double bit error detection, and double bit error correction.

While effective, these error correcting memory systems do not provide error correction on cache memory within multiprocessor shared memory systems. Typically, devices and subsystems such as a central processing unit or an input/output device within these multiprocessor shared memory systems have an associated cache for storing data while it is in use by the device or subsystem. As the system operates, data from the memory system is "checked out" to the cache. While the data is checked out to a cache, correcting errors in the cells in main memory will not correct errors in the cache. If the data is checked out for a long time, it is possible for multiple soft errors to accumulate within the data cell such that the number of errors is beyond the capabilities of the self-correcting memory system.

What is needed is a method and apparatus for eliminating soft errors in data checked out to a cache.

SUMMARY

One embodiment of the present invention provides a system that facilitates self-correcting memory in a shared-memory system. This system includes a main memory comprised of dynamic random access memory. A memory controller is coupled to the main memory for reading and writing memory locations and for marking memory locations that have been checked out to a cache. The system also includes a processor cache for storing data currently in use by a central processing unit. A communication channel is coupled to the processor cache and to the memory controller to facilitate communication between these units. The memory controller includes an error detection and correction mechanism, which uses an available error detection and correction system. The memory controller also includes a reading mechanism that is configured to read a data from the processor cache when a currently valid copy of the data is checked out to the processor cache. When the data is returned to the memory subsystem from the cache, the error detection and correction mechanism corrects errors in the data and stores a corrected copy of the data in the main memory.

In one embodiment of the present invention, the error detection and correction mechanism performs single bit error correction/double bit error detection.

In one embodiment of the present invention, the error detection and correction mechanism performs double bit error correction.

In one embodiment of the present invention, the system includes an input/output cache associated with an input/output device. The reading mechanism is further configured to read the data from the input/output cache when the currently valid copy is checked out to the input/output cache. When the data is returned to the memory subsystem from the input/output cache, the error detection and correction mechanism corrects errors in the data and stores the corrected copy of the data in the main memory.

In one embodiment of the present invention, the system includes a second processor cache. In this embodiment, the reading mechanism is further configured to read the data from the second processor cache when the currently valid copy is checked out to the second processor cache. When the data is returned to the memory subsystem from the second processor cache the error detection and correction mechanism corrects errors in the data and stores the corrected copy of the data in the main memory.

In one embodiment of the present invention, the system includes a marking mechanism within the memory controller. The marking mechanism is configured to mark a location in the main memory to indicate that the data from the location is checked-out to a cache. The cache can be any cache coupled to the system including the processor cache, the input/output cache, or the second processor cache.

In one embodiment of the present invention, the system includes a scrubbing mechanism within the memory controller that is configured to access each location within the main memory periodically. This scrubbing mechanism works in conjunction with the error detection and correction mechanism to detect and correct errors.

In one embodiment of the present invention, the system includes a detecting mechanism coupled to the scrubbing mechanism. The detecting mechanism is configured to detect that a location in the main memory is marked that the data from the location is checked-out to the cache. The reading mechanism is further configured to request a read from the communication channel if the location is so marked.

In one embodiment of the present invention, the communication channel is a coherent network.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Computing Device

Figure 1:
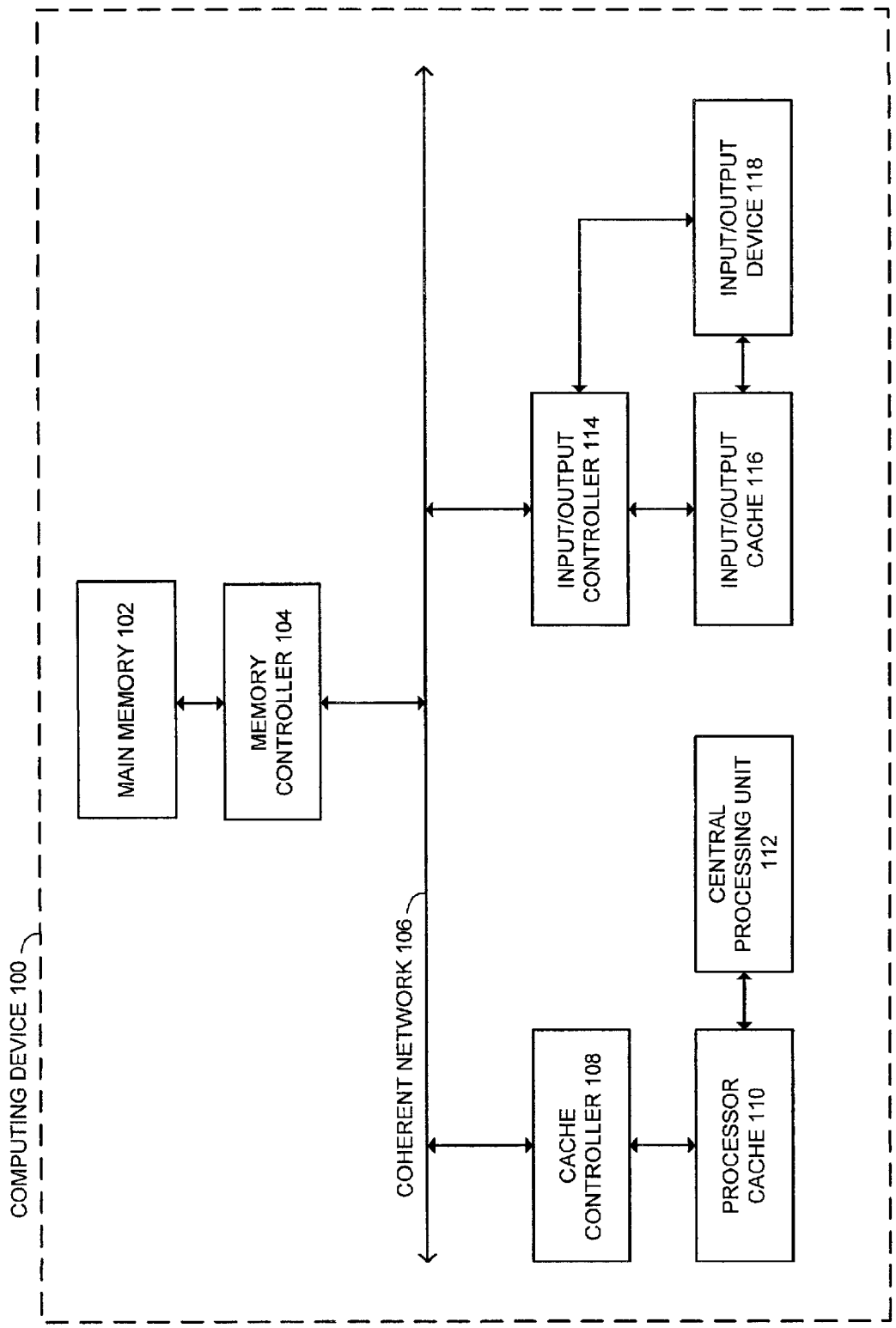
FIG. 1 illustrates computing device 100 in accordance with an embodiment of the present invention.

FIG. 1 illustrates computing device 100 in accordance with an embodiment of the present invention. Computing device 100 can generally include any type of computer system, including, but not limited to, a computer system based on a microprocessor, a mainframe computer, a digital signal processor, a portable computing device, a personal organizer, a device controller, and a computational engine within an appliance. Computing device 100 includes main memory 102, memory controller 104, coherent network 106, cache controller 108, processor cache 110, central processing unit 112, input/output controller 114, input/output cache 116, and input/output device 118.

Main memory 102 stores data associated with computer applications being executed by computing device 100. Memory controller 104 controls main memory 102 and interfaces main memory 102 with coherent network 106. Details of the operation of memory controller 104 are described below in conjunction with the description of FIG. 2.

Coherent network 106 couples various devices and subsystems within computing device 100. In operation, coherent network 106 transports data between the various devices and subsystems and includes signals related to maintaining coherency among the several caches within computing device 100. Details of the operation of coherent network 106 are well known in the art and are not described herein.

Processor cache 110 stores data for central processing unit 112. Typically, the data stored within processor cache 110 is recently accessed data and data stored near the recently accessed data within main memory 102. This allows central processing unit 112 to access data directly from processor cache 110 rather than across coherent network 106 for most access cycles. By accessing data from processor cache 110, central processing unit 112 avoids delays associated with contention on coherent network 106, and increased access time for data stored in main memory 102.

Central processing unit 112 can generally include any type of processor, including, but not limited to, a microprocessor, a mainframe computer, a digital signal processor, a personal organizer, a device controller and a computational engine within an appliance. Central processing unit 112 provides computational and decision making functions for computing device 100.

A practitioner skilled in the art will readily appreciate that cache controller 108, processor cache 110 and central processing unit 112 are duplicated multiple times within multiprocessor systems. Memory controller 104, coherent network 106, cache controller 108, input/output controller 114, and other controllers coupled to coherent network 106 function in concert to ensure data coherency within main memory 102, processor cache 110, input/output cache 116, and any additional cache associated with coherent network 106.

Input/output controller 114 controls input/output cache 116 and input/output device 118. In addition, input/output controller 114 couples input/output cache 116 and input/output device 118 to coherent network 106.

Input/output cache 116 buffers data for input/output device 118 and functions in much the same manner as processor cache 110 described above.

Input/output device 118 is a data interface between devices coupled to coherent network 106 and external devices such as disk drives, tape drives, modems, and the like. Input/output controller 114, input/output cache 116 and input/output device 118 may also be replicated as needed within computing device 100 as will be obvious to a practitioner skilled in the art.

Memory Controller

Figure 2:
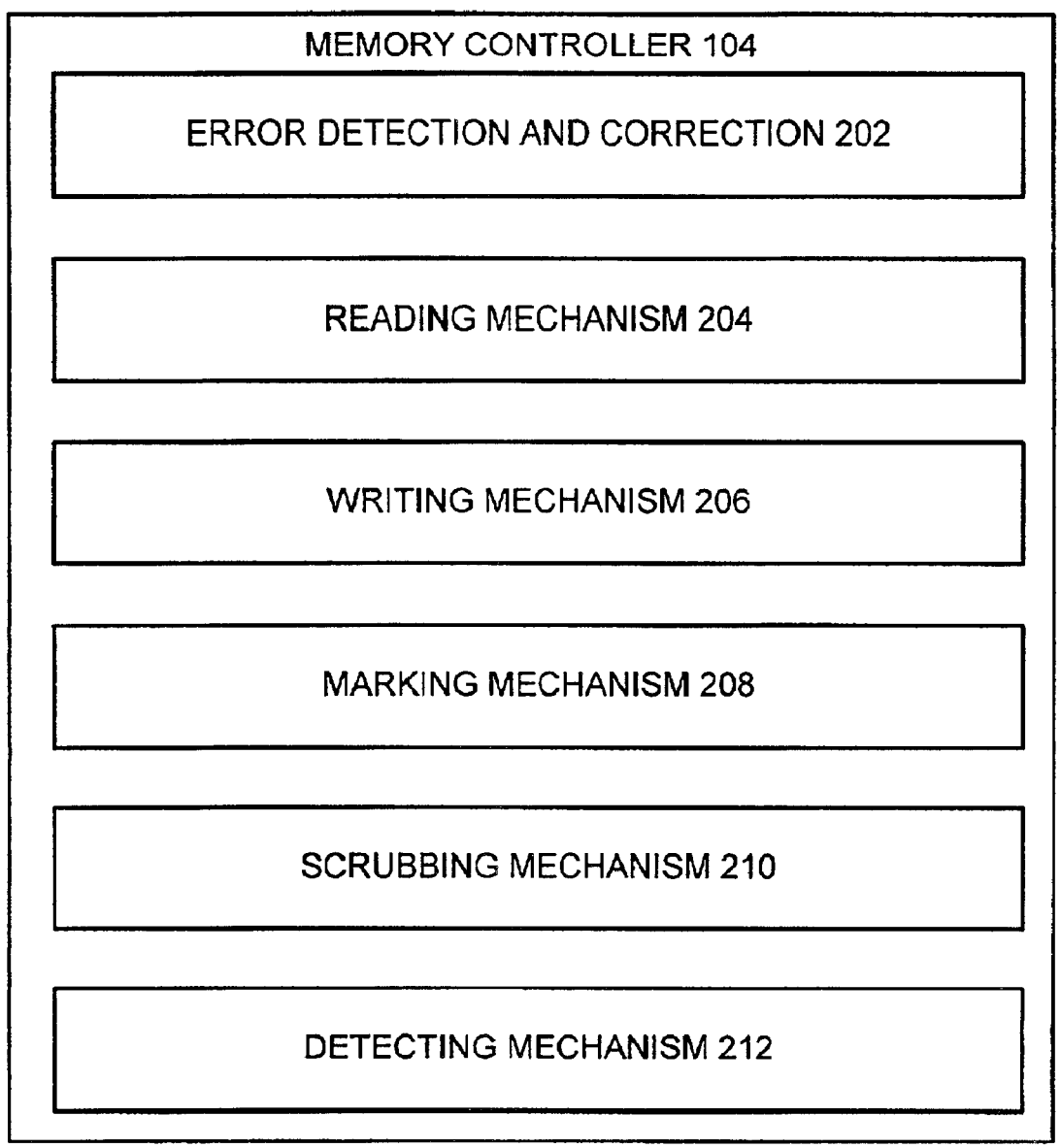
FIG. 2 illustrates memory controller 104 in accordance with an embodiment of the present invention.

FIG. 2 illustrates memory controller 104 in accordance with an embodiment of the present invention. Memory controller 104 includes error detection and correction mechanism 202, reading mechanism 204, writing mechanism 206, marking mechanism 208, scrubbing mechanism 210 and detecting mechanism 212.

Error detection and correction mechanism 202 functions to correct bit errors in memory locations. Error detection and correction mechanism 202 can be any available error detection and correction mechanism. Typical error detection and correction mechanisms include single bit error correction/double bit error detection mechanisms, and double bit error correction mechanisms. By correcting "soft" bit errors as they occur, data within computing device 100 will be less likely to accumulate errors that are beyond the capability of error detection and correction mechanism 202 to correct these errors.

Scrubbing mechanism 210 works in conjunction with error detection and correction mechanism 202. Scrubbing mechanism 210 periodically visits each location in main memory 102 and provides the data to error detection and correction mechanism 202. After any errors are corrected by error detection and correction mechanism 202, the location within main memory 102 is rewritten with the corrected data.

Marking mechanism 208 marks a location within main memory 102 as invalid when the current copy of data from the location has been checked out to a cache on coherent network 106. When the current copy of data is returned to its location within main memory 102, marking mechanism 208 marks the location as valid.

Detecting mechanism 212 works in conjunction with scrubbing mechanism 210. When scrubbing mechanism 210 visits a location that is marked as invalid within main memory 102, detecting mechanism 212 detects that the location has been marked as invalid. When the location is marked as invalid, the system causes the data to be read from the current cache location, corrected if necessary, and rewritten within main memory 102.

Reading mechanism 204 requests data from coherent network 106 when detecting mechanism 212 detects that a location within main memory 102 has been marked as invalid. Reading mechanism 204 provides the data returned from coherent network 106 to error detection and correction mechanism 202 so that any errors can be corrected.

Writing mechanism 206 writes the corrected data back to main memory 102.

Memory Corrections

Figure 3:
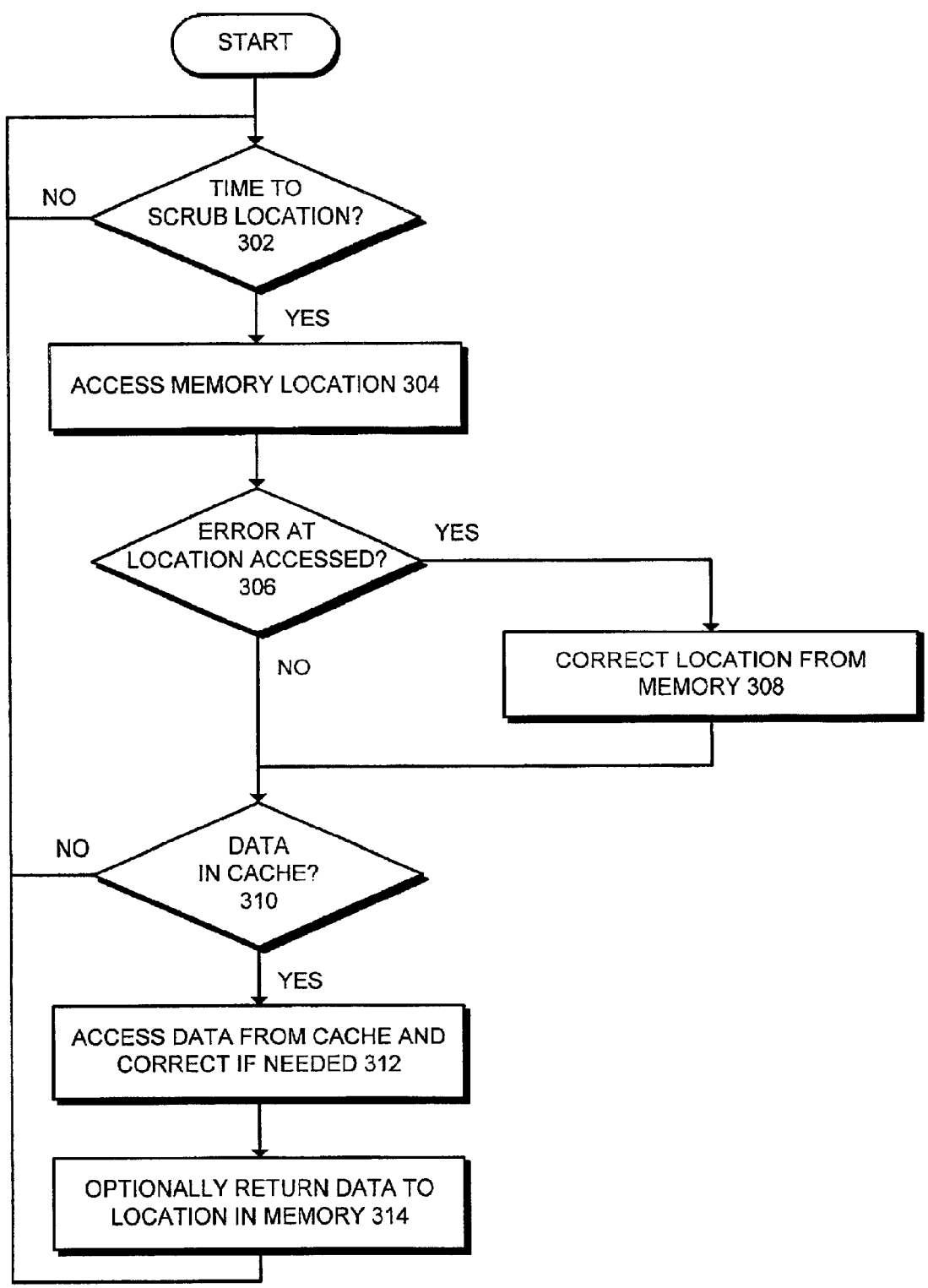
FIG. 3 is a flowchart illustrating the process of correcting memory errors in accordance with an embodiment of the present invention.

FIG. 3 is a flowchart illustrating the process of correcting memory errors in accordance with an embodiment of the present invention. The system starts when scrubbing mechanism 210 determines that it is time to scrub a location within main memory 102 (step 302). Typically, scrubbing mechanism 210 cycles through all memory locations within main memory 102 at a predetermined rate.

If it is time to scrub the location, memory controller 104 accesses the data from the memory location (step 304). Next, error detection and correction mechanism 202 determines if there is an error in the data at the location accessed (step 306). If there is an error in the data, error detection and correction mechanism 202 corrects the error (step 308).

After correcting the error at 308 or if there is no error at 306, detecting mechanism 210 determines if marking mechanism 208 has marked the location as invalid indicating that the data from the location has been checked out to a cache (step 310).

If the location has been marked as invalid by marking mechanism 208, reading mechanism 204 reads the data from the current cache location coupled to coherent network 106 and, if necessary, corrects the data from the cache (step 312). After any error in the cache data has been corrected, writing mechanism 206 optionally stores the corrected data in the location within main memory 102 (step 314).

The process continues from step 302 so that all locations within main memory 102 can be corrected.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus that facilitates self-correcting memory in a shared-memory system, comprising:
   a main memory;
   a memory controller coupled to the main memory;
   a processor cache;
   a communication channel coupled to the processor cache and to the memory controller; and
   an error detection and correction mechanism within the memory controller, which is configured to cycle through and correct errors in main memory;
   wherein after examining the data in a location in main memory and correcting any errors, if the error detection and correction mechanism determines that the data from the location has been checked out to the processor cache, the error detection and correction mechanism is configured to read the corresponding line in the processor cache, correct any errors, and write the corrected data from the cache to the location in the main memory.

2. The apparatus of claim 1, wherein the error detection and correction mechanism performs single bit error correction/double bit error detection.

3. The apparatus of claim 1, wherein the error detection and correction mechanism performs double bit error correction.

4. The apparatus of claim 1, further comprising:
   an input/output cache; and
   wherein the reading mechanism is further configured to read the data from the input/output cache when the currently valid copy of the data is checked out to the input/output cache;
   wherein the error detection and correction mechanism corrects errors in the data and stores the corrected copy of the data in the main memory.

5. The apparatus of claim 4, further comprising:
   a second processor cache;
   wherein the reading mechanism is further configured to read the data from the second processor cache when the currently valid copy of the data is checked out to the second processor cache; and
   wherein the error detection and correction mechanism corrects errors in the data and stores the corrected copy of the data in the main memory.

6. The apparatus of claim 5, further comprising a marking mechanism within the memory controller that is configured to mark a location in the main memory to indicate that the data from the location is checked-out to a cache, wherein the cache is one of, the processor cache, the input/output cache, and the second processor cache.

7. The apparatus of claim 6, further comprising a scrubbing mechanism within the memory controller that is configured to access each location within the main memory periodically to allow the error detection and correction mechanism to detect and correct errors.

8. The apparatus of claim 7, further comprising:
   a detecting mechanism coupled to the scrubbing mechanism that is configured to detect the location in the main memory when the location is marked that the data from the location is checked-out to the cache; and
   the reading mechanism that is further configured to request a read from the communication channel if the location is so marked.

9. The apparatus of claim 8, wherein the communication channel is a coherent network.

10. A multiprocessor shared-memory computing system that facilitates self-correcting memory, comprising:
    a main memory;
    a memory controller coupled to the main memory;
    a processor cache;
    a central processing unit coupled to the processor cache;
    a communication channel coupled to the processor cache and to the memory controller; and
    an error detection and correction mechanism within the memory controller, which is configured to cycle through and correct errors in main memory;
    wherein after examining the data in a location in main memory and correcting any errors, if the error detection and correction mechanism determines that the data from the location has been checked out to the processor cache, the error detection and correction mechanism is configured to read the corresponding line in the processor cache, correct any errors, and write the corrected data from the cache to the location in the main memory.

11. The multiprocessor shared-memory computing system of claim 10, wherein the error detection and correction mechanism performs single bit error correction/double bit error detection.

12. The multiprocessor shared-memory computing system of claim 10, wherein the error detection and correction mechanism performs double bit error correction.

13. The multiprocessor shared-memory computing system of claim 10, further comprising:
    an input/output cache;
    an input/output device coupled to the input/output cache; and the reading mechanism further configured to read the data from the input/output cache when the currently valid copy of the data is checked out to the input/output cache;

wherein the error detection and correction mechanism corrects errors in the data and stores the corrected copy of the data in the main memory.

14. The multiprocessor shared-memory computing system of claim 13, further comprising:

a second processor cache;

a second central processing unit coupled to the second processor cache; and the reading mechanism that is further configured to read the data from the second processor cache when the currently valid copy of the data is checked out to the second processor cache;

wherein the error detection and correction mechanism corrects errors in the data and stores the corrected copy of the data in the main memory.

15. The multiprocessor shared-memory computing system of claim 14, further comprising a marking mechanism within the memory controller that is configured to mark a location in the main memory to indicate that the data from the location is checked-out to a cache, wherein the cache is one of, the processor cache, the input/output cache, and the second processor cache.

16. The multiprocessor shared-memory computing system of claim 15, further comprising a scrubbing mechanism within the memory controller that is configured to access each location within the main memory periodically to allow the error detection and correction mechanism to detect and correct errors.

17. The multiprocessor shared-memory computing system of claim 16, further comprising:

a detecting mechanism coupled to the scrubbing mechanism that is configured to detect the location in the main memory when the location is marked that the data from the location is checked-out to the cache; and the reading mechanism that is further configured to request a read from the communication channel if the location is so marked.

18. The multiprocessor shared-memory computing system of claim 17, wherein the communication channel is a coherent network.

19. A method for facilitating self-correcting memory in a shared memory system, comprising:

marking as invalid a memory location within a plurality of memory locations when a data from the memory location is checked out to a cache;

scrubbing the plurality of memory locations for errors using an error detection and correction mechanism within the memory controller, which is configured to cycle through and correct errors in main memory;

detecting the memory location marked as invalid during scrubbing; and upon detecting the memory location marked as invalid;
reading the data from the cache associated with the memory location,
correcting an error in the data, and
writing the data to the location in the main memory.

20. The method of claim 19, wherein scrubbing the plurality of memory locations for errors includes:

accessing the memory location;

locating a valid copy of the data associated with the memory location;

reading the valid copy of the data;

correcting an error in the data;

writing the data to the memory location; and repeating the steps of accessing, locating, reading, correcting, and writing for each memory location within the plurality of memory locations.

* * * * *